(No Model.)
R. McLAUGHLIN.
THILL COUPLING.
No. 360,610. Patented Apr. 5, 1887.
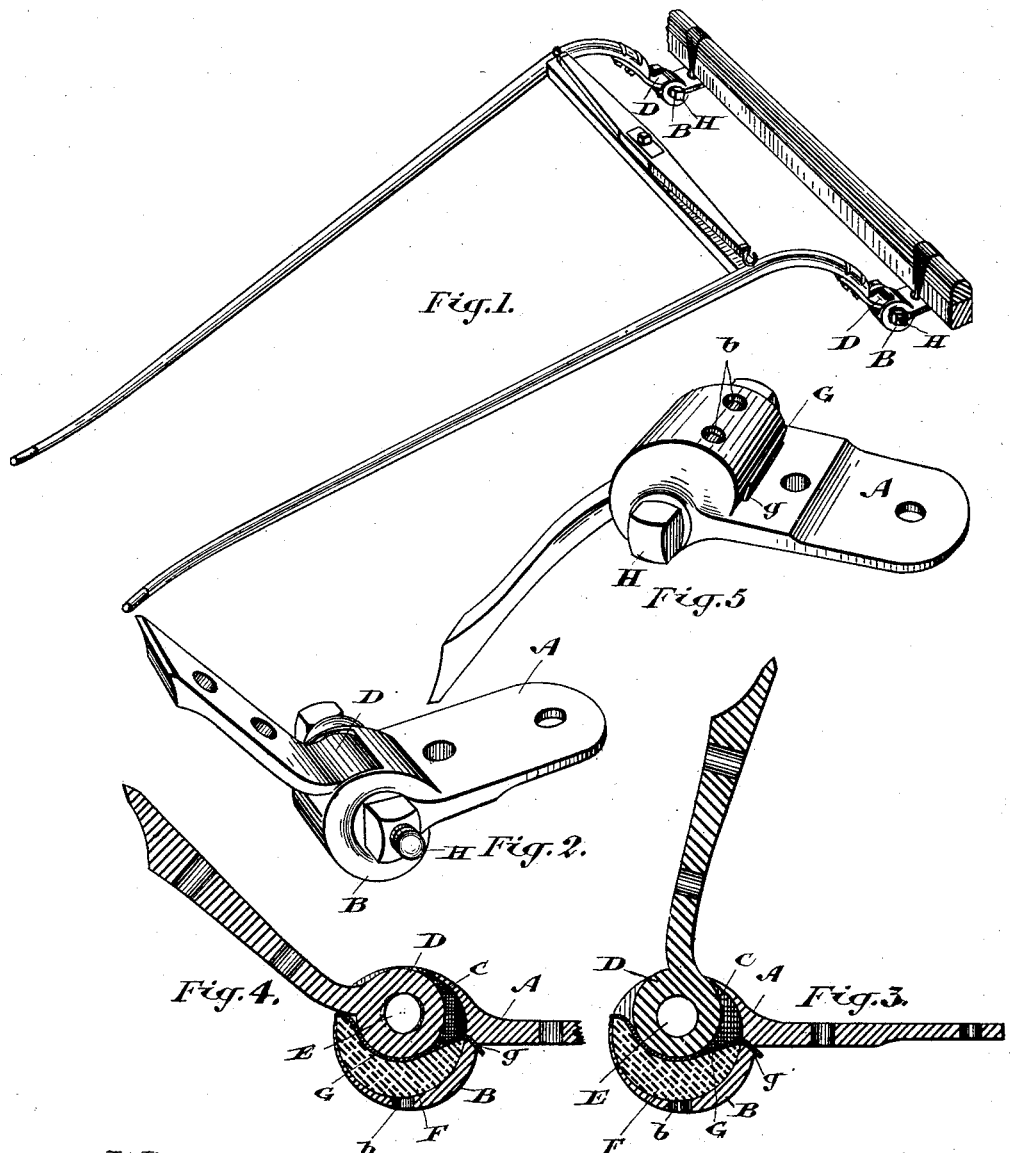
Witnesses.
H. B. Fetherstonhaugh
J. M. Jackson
Inventor:
R. McLaughlin
by Donald C. Ridout & Co
Attys

UNITED STATES PATENT OFFICE.

ROBERT McLAUGHLIN, OF OSHAWA, ONTARIO, CANADA.

THILL-COUPLING.

SPECIFICATION forming part of Letters Patent No. 360,610, dated April 5, 1887.

Application filed October 18, 1886. Serial No. 216,527. (No model.)

*To all whom it may concern:*

Be it known that I, ROBERT MCLAUGHLIN, of the town of Oshawa, in the county of Ontario and Province of Ontario, Canada, manufacturer, have invented certain new and useful Improvements in Thill-Couplings, of which the following is a specification.

The object of the invention is to design a thill-coupling which will be free from the noise or rattle so common to couplings now in use; and it consists, essentially, of a bracket fastened in the usual way to the axle of the vehicle, the outer end of said bracket being substantially cylindrical in form and recessed so as to receive a circular shaft-eye, the said shaft-eye being eccentrically pivoted, so that when the shafts are raised the bolt may be easily inserted in position, and when the shafts are lowered into their normal position the shaft-eye is held firmly by the action of the rubber spring situated beneath it, substantially as hereinafter more particularly explained.

Figure 1 is a perspective view of my thill-coupling attached to an ordinary pair of shafts. Fig. 2 is a detail of my thill-coupling. Fig. 3 is a section showing the position of the shaft-eye and shank when raised before the bolt is inserted. Fig. 4 is a section showing the shaft-eye and shank in its normal position, the bolt being removed. Fig. 5 is a perspective detail showing the thill-coupling turned upside down.

In the drawings like letters indicate corresponding parts in the same figures.

A is a bracket having a cylindrical end, B. Into the recess C of the end B, I insert a shaft-eye, D, which is eccentrically pivoted on the bolt H at E. Beneath this shaft-eye D, I place a semi-cylindrical rubber spring, F, which is separated from it by a curved plate, G, of brass or other suitable material. One end of this plate G rests upon the outer end of the cylindrical end B, while the other end passes through a slot, $g$, made through the bracket A.

It will be noticed, as before stated, that in Fig. 3 I do not show any bolt inserted; but as soon as the bolt is inserted and the shaft brought down the action of the eccentric shaft-eye D will be, as may be surmised on reference to Fig. 4, against the bolt H, but chiefly on account of the weight of the shafts upon the rubber spring F. It will be seen that by eccentrically pivoting the shaft-eye D upon the bolt H when the eye and shank are moved into their normal position the eye will press firmly against the rubber spring and the noise and rattle will be prevented.

By means of the plate G, situated between the shaft-eye D and the rubber spring F the wear upon the rubber is prevented.

In Fig. 5 I show two holes, $b$, to allow the water or dust which may accumulate in the recess $c$ to drop through.

It will be seen from this description that my thill-coupling is preferable to those now in use, as there are none now with which I am acquainted that the rubber does not wear out and the consequent rattle occur.

I am aware that a thill-coupling has been constructed with a rubber cushion provided with a covering of textile fabric, and lay no claim to such construction.

What I claim as my invention is—

1. The combination, with the bracket A, having cylindrical-shaped end B, having a recess, as described, of the rubber spring F in said recess, the shaft-eye D, eccentrically pivoted within said recess, and the metal plate G, secured in said end B between the eye D and spring F, substantially as described.

2. The combination, with the bracket A, provided with cylindrical end B and slot $g$, of the rubber spring F, inserted in a recess in said end B, the shaft-eye D, eccentrically pivoted within said recess, and the curved metal plate G, secured in said end between the eye D and spring F and having one end passed through the slot $g$, substantially as and for the purpose specified.

Signed at the town of Oshawa this 20th day of September, 1886.

ROBERT McLAUGHLIN.

In presence of—
J. W. PALMER,
S. J. MARTIN.